United States Patent
Vainikka et al.

(10) Patent No.: US 7,813,764 B2
(45) Date of Patent: Oct. 12, 2010

(54) BASEBAND MODULE AND DATA TRANSMISSION METHOD

(75) Inventors: Markku Vainikka, Kiviniemi (FI); Harri Kinnunen, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 1066 days.

(21) Appl. No.: 10/863,804

(22) Filed: Jun. 9, 2004

(65) Prior Publication Data
US 2005/0221836 A1 Oct. 6, 2005

(30) Foreign Application Priority Data
Apr. 6, 2004 (FI) .................................. 20045123

(51) Int. Cl.
*H04B 1/38* (2006.01)
(52) U.S. Cl. ..................................... 455/561
(58) Field of Classification Search .............. 455/456.1, 455/561, 560, 73, 101, 130, 132, 141, 456.5
See application file for complete search history.

(56) References Cited

U.S. PATENT DOCUMENTS

2001/0012287 A1* 8/2001 Miyazaki et al. ............ 370/352
2002/0077151 A1* 6/2002 Matthews et al. ........... 455/561
2003/0171099 A1* 9/2003 Kazakevich et al. ........ 455/101
2004/0017794 A1 1/2004 Trachewsky
2005/0002481 A1* 1/2005 Woo et al. ................... 375/354

FOREIGN PATENT DOCUMENTS

WO WO 02/32183 A1 4/2002
WO WO 03/077481 A1 9/2003

OTHER PUBLICATIONS

Altera Meets OBSAI RP3 Interface Specificiation for Cellular Base Station Architecture. (Dec. 16, 2003). http:..www.altera.com/corporate/news_room/releases/releases_archive/2003/products/nr-OBSAI_RP3_Interface_Specification.html.*
Open Base Station Architecture Initiative, "*Reference Point 3 Specification*", version 1.0, Feb. 5, 2004, pp. 1-72.

* cited by examiner

*Primary Examiner*—George Eng
*Assistant Examiner*—Wesley L Kim
(74) *Attorney, Agent, or Firm*—Squire, Sanders & Dempsey L.L.P.

(57) ABSTRACT

A baseband module for a base station is in a mobile communication network. The baseband module includes at least two baseband devices connected to each other by an internal interface, thereby forming a chain of baseband devices. The baseband module is connected to a radio frequency module by two external interfaces, each external interface being connected to a baseband device at the end of the chain of baseband devices.

22 Claims, 5 Drawing Sheets

US 7,813,764 B2

BASEBAND MODULE AND DATA TRANSMISSION METHOD

FIELD OF THE INVENTION

The invention relates to a baseband module suitable to be used in a radio network element, such as a base station within a mobile network.

BACKGROUND OF THE INVENTION

Increased demand and availability of mobile Internet services will create challenges for network operators and service providers due to the rising cost of the infrastructure. Large number of base transceiver stations (BTS) are needed to support the new technologies and to satisfy the capacity demand of the advanced services.

The Open Base Station Architecture Initiative (OBSAI) is an organization that aims to create a set of open specifications for the base station architecture. OBSAI has defined a modular base station architecture and detailed specifications for the interfaces between the modules. This architecture is depicted in FIG. 1. The base station in FIG. 1 includes a transport module 100 providing adaptation between external network interfaces and standard BTS internal interfaces. The processing module 102 provides baseband processing for the air interface and the radio module 104 provides radio frequency (RF) transceivers and conversion between digital baseband signals and analogue RF signals. Function module 106 includes functionality needed by the radio module. The control module 108 provides control processing of the base station. The open interfaces defined by OBSAI are shown in FIG. 1 by reference points RP1, RP2 and RP3. RP1 interchanges control, such as status, alarm and synchronization data. RP2 interchanges user data between the transport module and the processing module. RP3 interchanges formatted air interface user data and fast control data between the base band module and the radio module.

FIG. 2 illustrates one prior art base station topology, a star topology, for implementing the baseband module. FIG. 2 also shows the external interface 214 between the baseband module 202 and the RF module 204. The baseband module 202 includes a number of baseband devices 222A to 222D (indicated by F1 to F4) and a routing device 220 (indicated by O). The routing device is responsible for distributing/collecting all data to/from the baseband devices via the internal interfaces 224A to 224D.

In FIG. 2, the interfaces can include at least one OBSAI RP3 interfaces, for instance. As shown by FIG. 2, the data transfer capacity of the external interface and all the internal interfaces 224A to 224D is "N*RP3" (only data rate of 224A is shown in the figure), where N refers to the number of sub-interfaces and RP3 to the type of interface. In the case of RP3, the smallest data rate is 768 Mbps. The star topology has the disadvantage that an expensive routing device is needed.

Another prior art topology avoiding the use of a separate routing device is shown in FIG. 3. In this so-called daisy chain topology, the baseband devices 322A to 322D are arranged in a chain and the baseband device 322A is directly connected to an external interface 314. The number of interfaces (N) and the data rate of the baseband internal interfaces 324A to 324C is the same as in the external connections. In spite of the advantages over the star topology, the daisy-chain topology still suffers from a large number of interfaces per baseband device.

BRIEF DESCRIPTION OF THE INVENTION

It is thus one object of the present invention to simplify the structure of the baseband module.

In one aspect of the invention there is provided a baseband module for a base station in a mobile communication network, comprising at least two baseband devices connected to each other by an internal interface thereby forming a chain of baseband devices, the baseband module being connected to a radio frequency module by two external interfaces, each external interface being connected to a baseband device at the end of the chain of baseband devices.

In one aspect of the invention, there is provided a data transmission method in a base station of a mobile communication network, comprising the step of transferring data in an external interface between a baseband module and a radio frequency module via both ends of a chain of baseband devices belonging to the baseband module.

The preferred embodiments of the invention are disclosed in the dependent claims.

The invention thus relates a base band module suitable to be used in base stations in a mobile network. A baseband module performs the baseband processing of a base station. The base station may contain several baseband modules, which each process some part of the baseband processing for the different carriers supported by the base station. An example implementation of a baseband module is a printed circuit board. The baseband module typically consists of several identical baseband processing devices. Each processing device performs some portion of the baseband processing done on the baseband module. A baseband processing device may be, for example, an integrated circuit or a cluster of integrated circuits. The baseband processing device may contain a programmable processor, acceleration hardware and interfacing hardware.

The concept base station covers all various network elements suitable for implementing the air interface towards mobile terminals using the network. Thus the base station covers a base station according to the GSM (Global System for Mobile Communication) system and Node B of UMTS (Universal Mobile Telephony System) system, for instance. Other corresponding network elements in other mobile networks are considered covered by the inventive idea.

In one embodiment, the inventive idea is applied to a base station complying with the architecture standardized by OBSAI. In that case, the interface between the baseband and RF modules is an RP3 interface. The OBSAI structure as explained in accordance with the invention shall be considered to represent one advantageous embodiment, without restricting the invention thereto. The data rates of the interfaces and sub-interfaces presented have thus been given as examples, not in order to delimit the invention.

The invention is characterised by the idea that both ends of the chain of baseband devices are connected to an RF module. In the context of the invention, the interface towards the RF module is called "external interface". The baseband module has thus two external interfaces, one from each end of the chain. Each external interface includes one or more sub-interfaces, such as RP3 interfaces. The interfaces between the baseband devices are called "internal interfaces". Correspondingly, each internal interface includes one or more sub-interfaces. Each sub-interface has a minimum data transmission rate, referred to as "rate". Sub-interfaces using a higher data rate than the minimum data rate are referred to as "double rate" or "triple rate", for instance. In the baseband module internal interfaces it is possible to use even higher data rates than "triple rate", which is here given only as an example.

In one aspect of the invention, the baseband devices in the end of the chain comprise a larger number of external sub-interfaces than internal sub-interfaces. This reduction of internal sub-interfaces is achieved by using a higher data rate in the internal interfaces than in the external interfaces. The data rate in the internal interface can be equal or even exceed the sum of the data rates in the external interfaces.

In the invention, data can be transferred in both directions along the chain, which is a daisy chain, for instance. That is, uplink data received from mobile terminals can be moved both ways along the chain of baseband devices. The baseband module is thus configured to transfer data received in either end of the chain to all the baseband devices belonging to the chain, if needed.

The invention provides the significant advantage that the number of interfaces per device in the baseband module can be reduced, thereby resulting into a simplified baseband module structure and savings in the development costs of the module.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 4A:
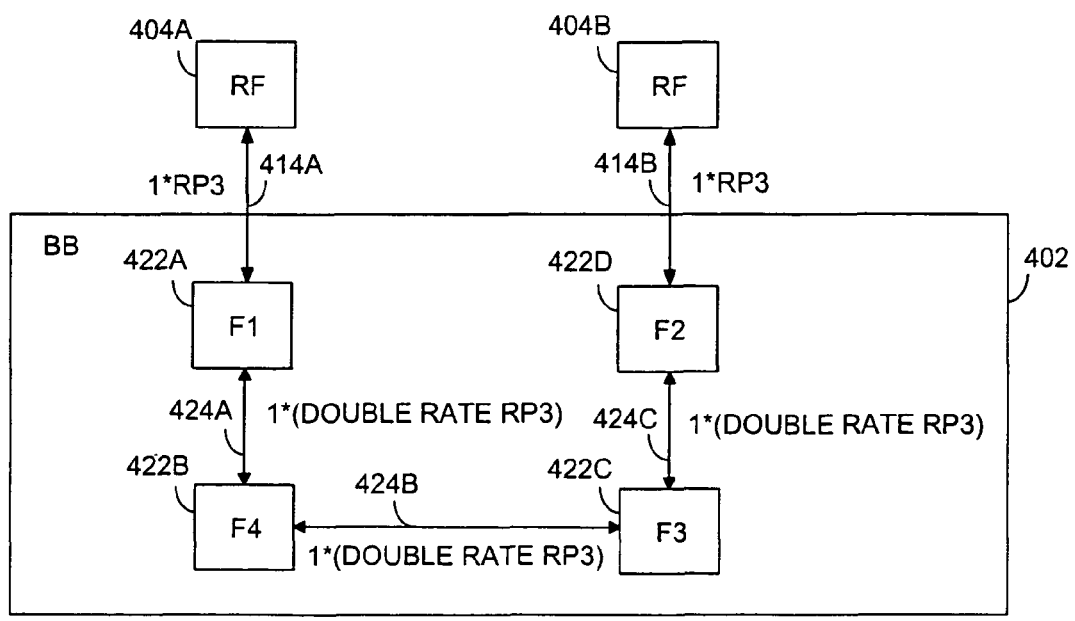
FIG. 4A shows one embodiment of a topology according to the invention.

FIG. 4A shows one embodiment of a topology according to the invention. In FIG. 4A, the baseband devices 422A to 422D within a baseband module 402 are arranged in a chain so that the baseband devices F3 and F4 in the middle of the chain have an interface with two other baseband devices. F3, for instance, has internal interfaces 424B and 424C to F2 and F4. The baseband devices at the end of the chain, that is, devices F1 and F2 have one internal interface and one external interface. F1, for instance, has an internal interface 424A with baseband device F4 and an external interface 414A with RF module 404A.

In FIG. 4A, the baseband processing capacity of the baseband module is 2+2 meaning that there are two carrier waves and two sectors to be served. Each carrier wave is transmitted/received by two antennas whereby the baseband module 402 shall be capable of handling 8 duplex data streams. Therefore, the baseband module has two external RP3 sub-interfaces, each of the sub-interfaces being capable of handling 4 data streams.

FIG. 4A shows how this need is satisfied in one embodiment of the invention. The baseband device 422A has been illustrated to have one RP3 interface with RF module 414A and the other external interface 414B is operated by the baseband device 422D. The baseband module 402 shall be capable of transmitting all data to each baseband device 310A to 310D in the chain. That is, baseband device F2 422D shall have the possibility to transmit data via the external interface 414A as well as via the external interface 414B served by itself. Vice versa, data received via the interface 414A shall be transmitted to device 422D if need be, that is, if device 422D is responsible for processing user data for a user that is in connection with the baseband module via the interface 414A.

Figure 1:
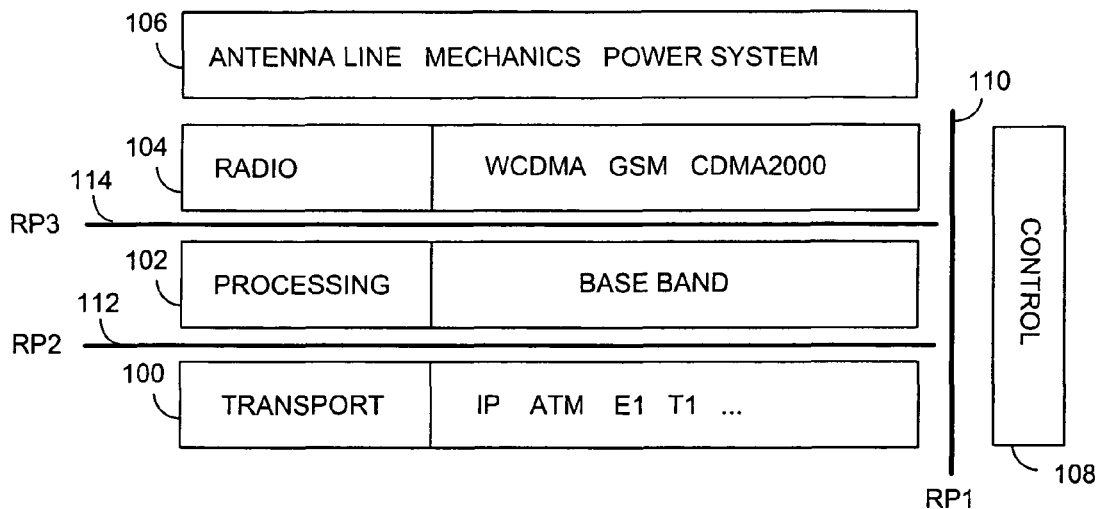
FIG. 1 illustrates an already explained prior art modular base station structure.
Figure 2:
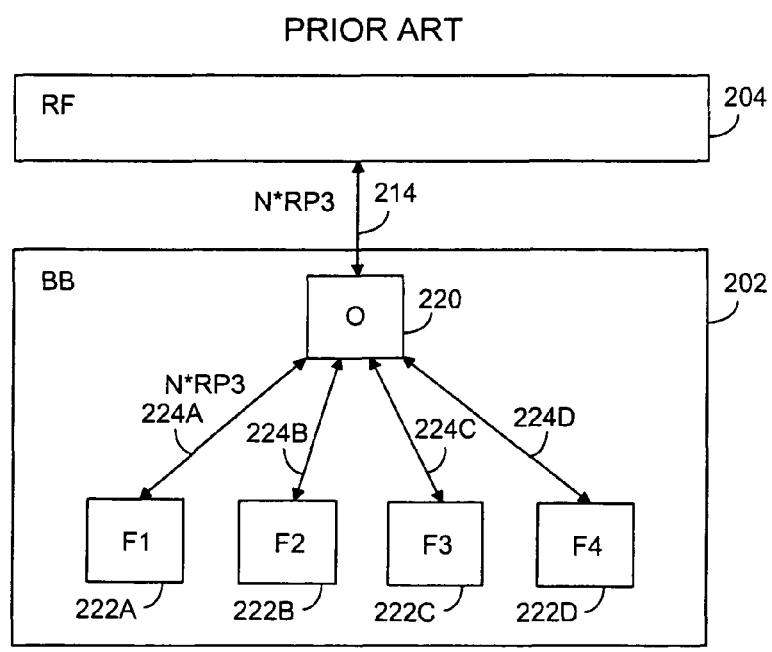
FIG. 2 illustrates an already explained prior art topology.
Figure 3:
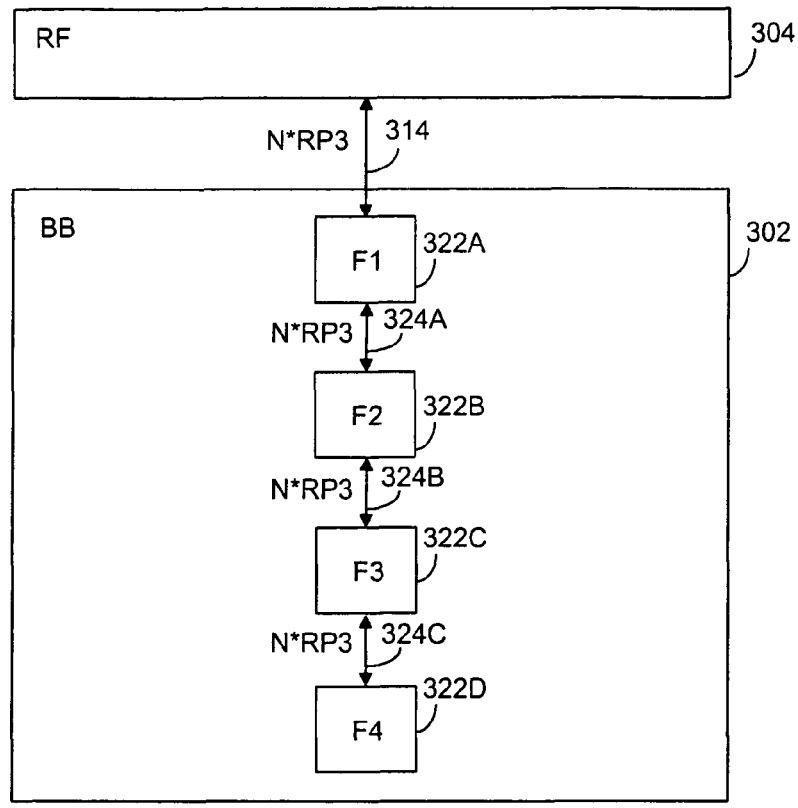
FIG. 3 illustrates another already explained prior art topology.

In order to be able to support the described two-directional transmission in the internal interfaces, the internal interfaces in FIG. 4A are configured to be double rate interfaces compared to single rate interfaces at the external interfaces 414A and 414B. Reference is made to FIG. 3, where the total number of needed RP3 interfaces is 8. FIG. 4A shows that in the disclosed embodiment, only 5 RP3 interfaces are needed.

Figure 4B:
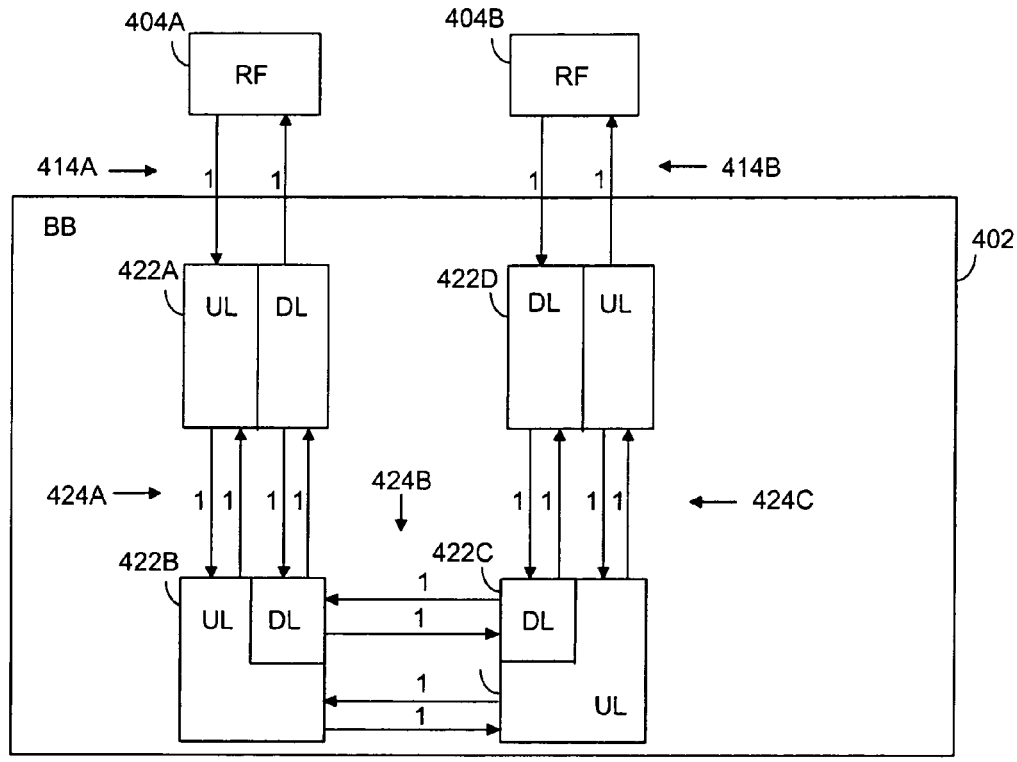
FIG. 4B illustrates another view of the embodiment of FIG. 4A.

FIG. 4B specifies the embodiment of FIG. 4A. External interfaces 414A and 414B have been illustrated to include one RP3 sub-interface meaning that the interface supports duplex data stream at a predetermined rate. FIG. 4B also shows the internal double rate RP3 sub-interfaces 424A to 424C. For instance, in the interface 424A, the interface is capable of conveying also uplink data received via the interface 414B in addition to uplink data received via the interface 414A. The uplink and downlink functionalities can be separated, in the baseband device, as shown in FIG. 4B. Additionally, baseband devices are configured to receive uplink and downlink data from either the neighbouring baseband device or the external interface. Correspondingly, a base band device comprises means for transmit downlink data towards both two internal, or one internal and one external, interfaces that the baseband device has.

Figure 5:
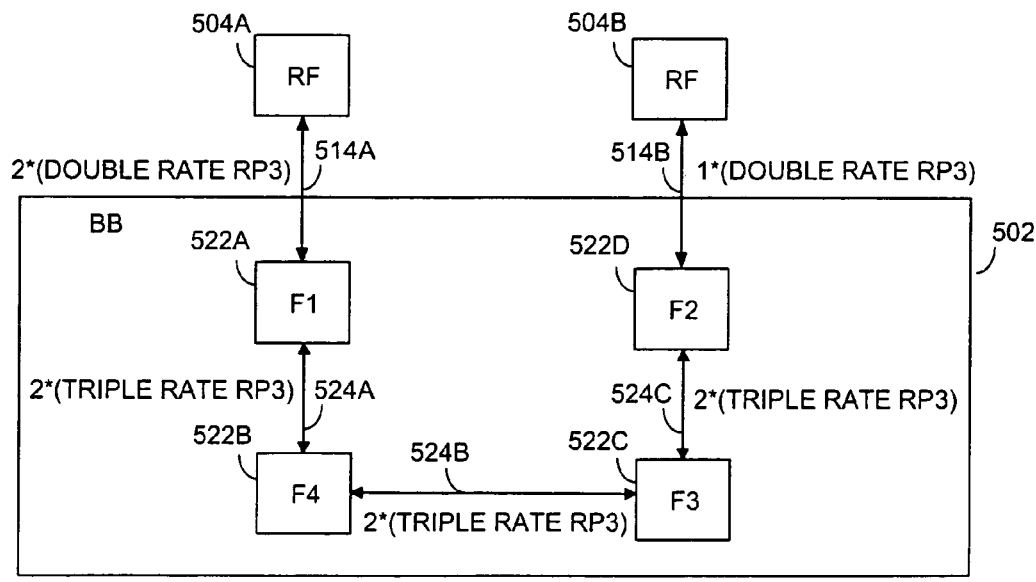
FIG. 5 shows still one embodiment of the invention.

FIG. 5 illustrates another embodiment of the invention. The baseband module 502 arranged to support a 6-sector configuration, wherein one or two double rate carriers are served in each sector. The RF module 504A supports four sectors and RF module 504B serves two carrier waves in two sectors. Each double rate RP3 can thus transfer data of 2 carriers transmitted in two sectors. The internal interfaces have a higher transmission capacity, that is, triple rate. The internal interfaces 524A to 524C are thereby capable of serving all the data transferred over both external interfaces 514A and 514B. From FIG. 5 it can be seen that altogether 9 RP3 interfaces are needed. If a baseband module supporting the similar amount of RF interfaces would be constituted using the prior art chain topology of FIG. 3, altogether 12 RP3 interfaces would be needed, since both the external and internal interfaces would have the transmission capacity of 3*(double rate RP3).

Figure 6A:
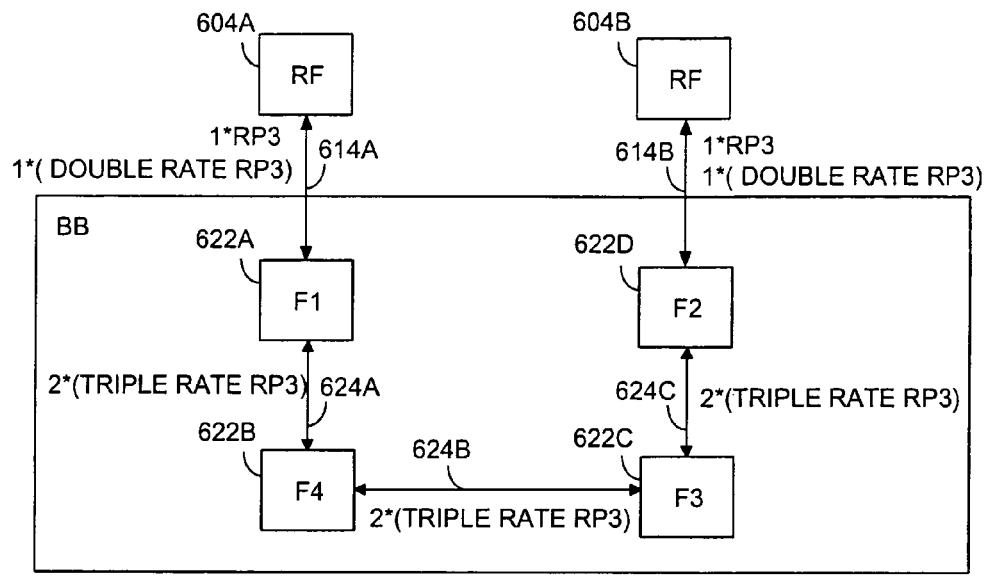
FIG. 6A shows one embodiment of a topology according to the invention.

FIG. 6A shows still an embodiment of a topology according to the invention, that is, a configuration capable of supporting 4 carriers in three sectors (4+4+4). Both of the external interfaces are capable of handling one single rate RP3 and one double rate RP3. The total processing capacity of the baseband module is thus 4+4+4, that is, four carrier waves in three sectors. The internal interfaces 624A to 624C have been depicted to have two triple rate interfaces.

Figure 6B:
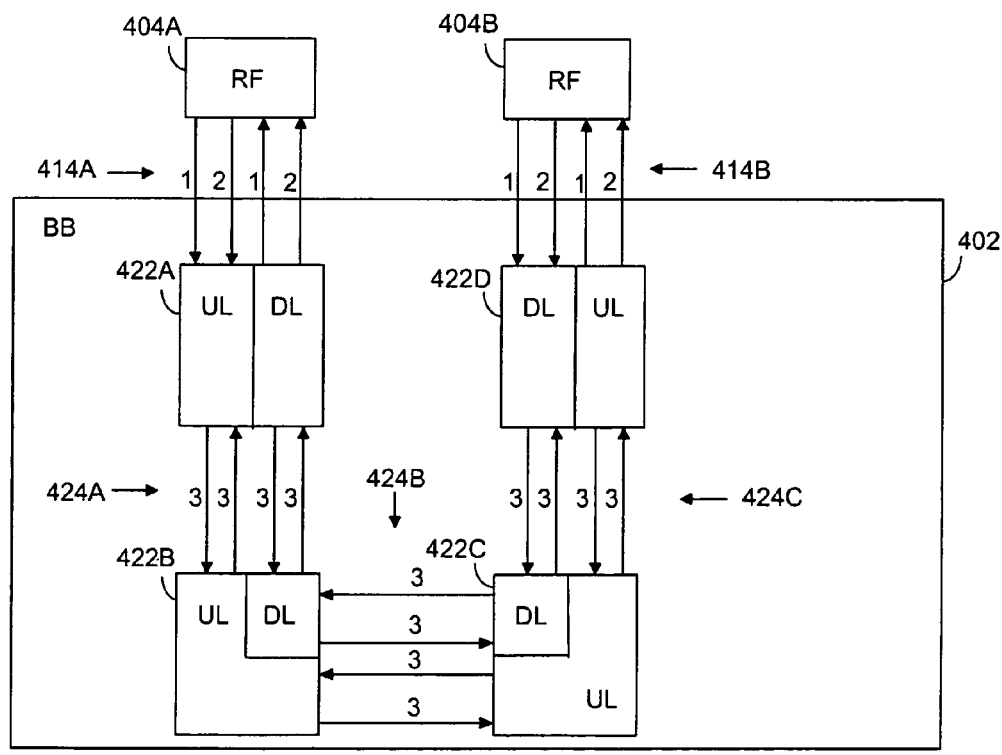
FIG. 6B illustrates another view of the embodiment of FIG. 6A.

The embodiment of FIG. 6A is further specified in FIG. 6B illustrating the data rates in the various interfaces. The total number of RP3 interfaces is shown to be 10, whereas the implementation of the same as a single-end daisy chain would require 16 RP3 interfaces.

In the example topologies presented above, it can be seen that part of the data flows in one direction and part to the other direction. To comply with the data streams coming from different directions, additional buffering can be provided in the baseband devices to re-align the data streams and to compensate for possible latency of the data streams. Furthermore, in order to support different data rates in the two interfaces of a baseband device, multiplexing/demultiplexing of data streams can be provided. This especially concerns baseband devices in the ends of the chain having one external interface and one internal interface. If, for instance, two external sub-interfaces shall be combined to one internal sub-interface, data has to be multiplexed between the interfaces.

Figure 7:
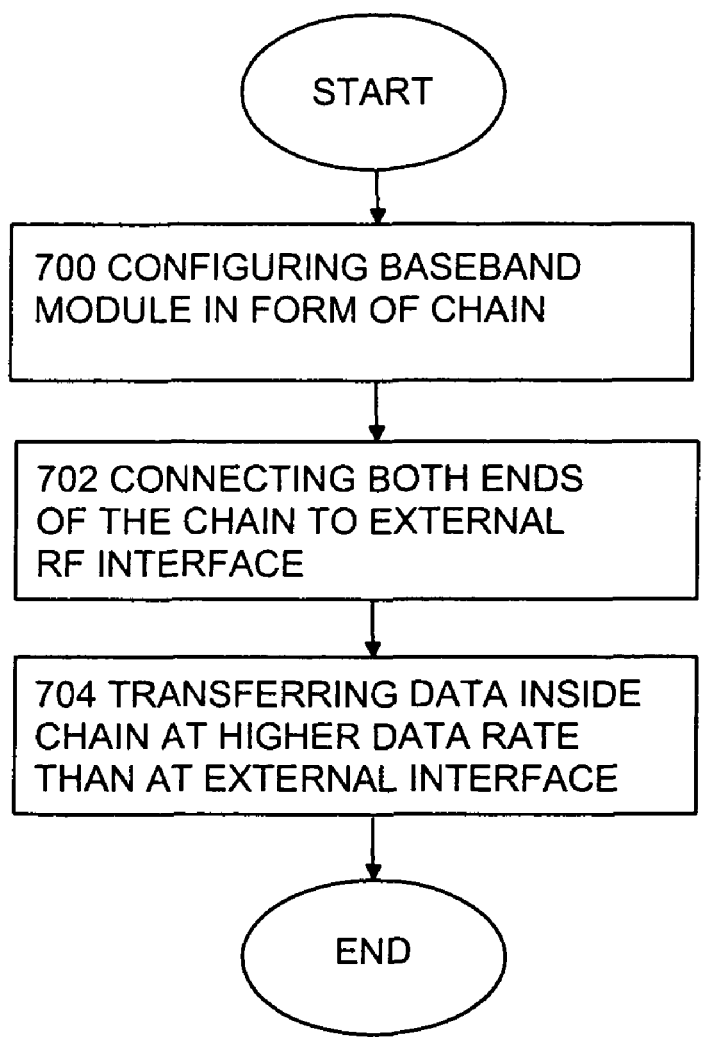
FIG. 7 shows one embodiment of the method according to the invention.

One embodiment of the method according to the invention is illustrated in FIG. 7. Step 700 shows a configuring step of the method, that is, manufacturing of a printed circuit board, where individual baseband devices are in the form of the chain. The both ends of the chain are according to step 702 connected to a radio frequency module. When the base station is in use, data is transferred in the chain at a higher data rate than towards the RF module. In one embodiment of the method when the base station is in use, uplink data can traverse in the chain in both directions. In one embodiment, the uplink and downlink data are multiplexed into the same internal interface. The baseband module shall be capable of transferring the received data through the whole chain until the device responsible for processing data has been reached. The same applies to downlink data, the baseband module is configured to transfer data to be transmitted through the whole chain, if need be.

It will be obvious to a person skilled in the art that, as technology advances, the inventive idea can be implemented in various ways. The invention and its embodiments are not limited to the examples described above but may vary within the scope of the claims.

The invention claimed is:

1. An apparatus, comprising:
at least two baseband devices in a baseband module for a base station connected to each other by an internal interface, configured to form a chain of baseband devices, the baseband module being connected to a radio frequency module by first and second external interfaces, wherein
the first external interface is connected to a first baseband device at a first end of the chain of baseband devices,
the second external interface is connected to a second baseband device at a second end of the chain of baseband devices,
the baseband module is configured to transfer data received in either end of the chain to all baseband devices belonging to the chain, and
a total data rate in the internal interface at least equals a sum of total data rates in the two external interfaces.

2. The apparatus according to claim 1, wherein one of the first and second external interfaces and the internal interface comprises at least one sub-interface.

3. The apparatus according to claim 2, wherein each of the first and second external interfaces and the internal interface comprises the at least one sub-interface.

4. The apparatus according to claim 2, wherein the first baseband device at the first end of the chain comprises a larger number of external sub-interfaces than internal sub-interfaces.

5. The apparatus according to claim 4, wherein a second baseband device at a second end of the chain comprises the larger number of said external sub-interfaces than said internal sub-interfaces.

6. The apparatus according to claim 2, wherein the baseband module is configured to transfer, in an internal sub-interface, data transferred via at least two external sub-interfaces.

7. The apparatus according to claim 2, wherein the baseband module is configured to transfer, in an internal sub-interface, uplink data received via at least one of the first and second external interfaces.

8. The apparatus according to claim 7, wherein the baseband module is configured to transfer, in the internal sub-interface, the uplink data received via both of the first and second external interfaces.

9. The apparatus according to claim 2, wherein, in the internal interface, the at least one sub-interface comprises an OBSAI RP3 interface.

10. The apparatus according to claim 2, wherein the baseband module is configured to multiplex, into a same internal sub-interface, data to be transmitted and data to be received via the external interface.

11. The apparatus according to claim 1, wherein the baseband module is configured to support a higher data rate in the internal interface than in either of the two external interfaces.

12. The apparatus according to claim 1, wherein the at least two baseband devices in the chain are configured to transfer both uplink and downlink data in both directions along the chain.

13. The apparatus according to claim 1, wherein the chain of baseband devices comprising the at least two baseband devices forms a daisy-chain.

14. A method, comprising:
connecting at least two baseband devices in a baseband module for a base station connected to each other by an internal interface to form a chain of baseband devices;
connecting the baseband module to a radio frequency module using first and second external interfaces, wherein
the first external interface is connected to a first baseband device at a first end of the chain of baseband devices, and
the second external interface is connected to a second baseband device at a second end of the chain of baseband devices; and
transferring data in the first and second external interfaces between the baseband module and the radio frequency module via both ends of the chain of baseband devices belonging to the baseband module, wherein the baseband module is configured to transfer data received in either end of the chain to all baseband devices belonging to the chain, and a total data rate in the internal interface at least equals a sum of total data rates in the two external interfaces.

15. The method according to claim 14, wherein, in the transferring, at least one of the external interface and internal interfaces between the baseband devices comprises at least one sub-interface.

16. The method according to claim 15, wherein, in the transferring, each of the external interface and the internal interfaces between the baseband devices comprises the at least one sub-interface.

17. The method according to claim 15, wherein, in the transferring, data transferred via at least two external sub-interfaces is transferred in one internal sub-interface.

18. The method according to claim 15, wherein, in the transferring, data is transferred in at least one internal sub-interface at a higher data rate than in an external sub-interface transferring the data.

19. The method according to claim 15, wherein, in the transferring, the at least one sub-interface comprises an OBSAI RP3 interface.

20. The method according to claim 14, wherein, in the transferring, both uplink and downlink data is transferred in the chain of base-band devices to both directions along the chain.

21. An apparatus, comprising:
interfacing means for externally interfacing a baseband module and a radio frequency module and comprising a first external interface connected to a first baseband device at a first end of a chain of baseband devices, and a second external interface connected to a second baseband device at a second end of the chain of baseband devices connected to each other by an internal interface; and
transferring means for transferring data in the interfacing means between the baseband module and the radio frequency module via both ends of the chain of baseband devices belonging to the baseband module, wherein the baseband module is configured to transfer data received in either end of the chain to all baseband devices belonging to the chain, and a total data rate in the internal interface at least equals a sum of total data rates in the two external interfaces.

22. An apparatus, comprising:
an interface configured to externally interface a baseband module and a radio frequency module and comprising a first external interface configured to be connected to a first baseband device at a first end of a chain of baseband devices, and a second external interface configured to be connected to a second baseband device at a second end of the chain of baseband devices connected to each other by an internal interface; and
a transmitter configured to transfer data in the interface between the baseband module and the radio frequency module via both ends of the chain of baseband devices belonging to the baseband module, wherein the baseband module is configured to transfer data received in either end of the chain to all baseband devices belonging to the chain, and a total data rate in the internal interface at least equals a sum of total data rates in the two external interfaces.

* * * * *